United States Patent
Kim (10) Patent No.: US 11,695,165 B2
(45) Date of Patent: Jul. 4, 2023

(54) BATTERY SYSTEM

(71) Applicant: SAMSUNG SDI CO., LTD., Yongin-si (KR)

(72) Inventor: Byeongjo Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 288 days.

(21) Appl. No.: 17/071,235

(22) Filed: Oct. 15, 2020

(65) Prior Publication Data

US 2021/0119277 A1 Apr. 22, 2021

(30) Foreign Application Priority Data

Oct. 17, 2019 (KR) .................. 10-2019-0129338

(51) Int. Cl.
*H02J 7/00* (2006.01)
*H01M 10/48* (2006.01)
*H01M 50/204* (2021.01)
*H01M 10/44* (2006.01)

(52) U.S. Cl.
CPC ......... *H01M 10/482* (2013.01); *H02J 7/0019* (2013.01); *H02J 7/00304* (2020.01); *H02J 7/007182* (2020.01); *H01M 10/441* (2013.01); *H01M 50/204* (2021.01); *H02J 7/0014* (2013.01); *H02J 7/0016* (2013.01)

(58) Field of Classification Search
CPC .. H01M 10/482; H02J 7/0019; H02J 7/00304; H02J 7/007182
USPC ........................................................ 320/136
See application file for complete search history.

(56) References Cited

U.S. PATENT DOCUMENTS 8,054,034 B2 * 11/2011 Lim ..................... B60L 58/15
324/427
8,704,405 B2 * 4/2014 Deng .................. H01M 10/482
307/71

(Continued)

FOREIGN PATENT DOCUMENTS

CN 110198058 A * 9/2019
CN 110198058 A 9/2019

(Continued)

OTHER PUBLICATIONS

European Search Report dated Feb. 23, 2021.

*Primary Examiner* — John T Trischler
(74) *Attorney, Agent, or Firm* — Lee IP Law, P.C.

(57) ABSTRACT

A battery system includes: first and second battery modules connected between first and second system terminals in parallel; and a controller controlling the first and second battery modules. The first battery module includes a first battery and a first main switch, and a first balancing switch and a first balancing resistor, which are connected to the first main switch in parallel. The second battery module includes a second battery and a second main switch, and a second balancing switch and a second balancing resistor, which are connected to the second main switch in parallel. The controller is configured to detect a first battery voltage and a second battery voltage, and when an absolute value of a difference between the first and second battery voltages is greater than a first reference value, to open the first and second main switches and to close the first and second balancing switches.

5 Claims, 6 Drawing Sheets

(56) References Cited

U.S. PATENT DOCUMENTS

| | | | | |
|---|---|---|---|---|
| 8,847,552 B2* | 9/2014 | Ro | ................. | H02J 7/0048 320/125 |
| 8,901,890 B2* | 12/2014 | Yamauchi | ................. | H02J 3/381 429/61 |
| 9,030,167 B2* | 5/2015 | Yamaguchi | ................. | H01M 10/441 320/117 |
| 9,166,419 B2* | 10/2015 | Girard | ................. | H02J 7/0068 |
| 9,197,080 B2* | 11/2015 | Shiraishi | ................. | H02J 7/0014 |
| 9,300,016 B2* | 3/2016 | Yun | ................. | H01M 10/482 |
| 9,520,734 B2* | 12/2016 | Katou | ................. | H02J 7/0069 |
| 9,581,650 B2* | 2/2017 | Hotta | ................. | B60L 58/12 |
| 9,722,436 B2* | 8/2017 | Shiraishi | ................. | H02J 7/0014 |
| 9,755,443 B2* | 9/2017 | Fink | ................. | H02J 7/0029 |
| 9,768,612 B2* | 9/2017 | Iwasaki | ................. | H02J 3/32 |
| 9,917,461 B2* | 3/2018 | Shiobara | ................. | H02J 7/0068 |
| 9,954,379 B2* | 4/2018 | Lee | ................. | B60L 58/14 |
| 10,008,862 B2* | 6/2018 | Takizawa | ................. | B60L 58/21 |
| 10,312,553 B2* | 6/2019 | Kubota | ................. | H02J 7/0019 |
| 10,326,287 B2* | 6/2019 | Hoyt | ................. | H02J 7/0024 |
| 10,491,012 B2* | 11/2019 | Kang | ................. | H02J 7/0029 |
| 10,693,198 B2* | 6/2020 | Ito | ................. | H02J 7/007192 |
| 10,871,523 B2* | 12/2020 | Inamoto | ................. | G01R 31/3835 |
| 11,070,073 B2* | 7/2021 | Tiedtke | ................. | H02J 7/0068 |
| 11,228,190 B2* | 1/2022 | Tiedtke | ................. | B60R 16/033 |
| 11,251,637 B2* | 2/2022 | Tiedtke | ................. | B60L 58/12 |
| 11,322,936 B2* | 5/2022 | Zhou | ................. | H02J 7/00 |
| 2008/0090133 A1* | 4/2008 | Lim | ................. | H02J 7/0016 429/50 |
| 2011/0074354 A1* | 3/2011 | Yano | ................. | H01M 10/441 180/65.29 |
| 2011/0234006 A1* | 9/2011 | Deng | ................. | H01M 10/441 307/71 |
| 2011/0305925 A1* | 12/2011 | Ro | ................. | H01M 10/441 429/50 |
| 2012/0313439 A1* | 12/2012 | Yamaguchi | ................. | H02J 7/0016 307/71 |
| 2013/0063080 A1* | 3/2013 | Shiraishi | ................. | H02J 7/0014 320/107 |
| 2013/0106357 A1* | 5/2013 | Girard | ................. | H02J 7/0025 320/126 |
| 2013/0113432 A1* | 5/2013 | Suzuki | ................. | H02J 7/0014 320/134 |
| 2013/0193768 A1* | 8/2013 | Iwasaki | ................. | H02J 1/10 307/85 |
| 2013/0244065 A1* | 9/2013 | Yamauchi | ................. | H02J 7/00304 429/61 |
| 2013/0293006 A1* | 11/2013 | Kang | ................. | H02J 7/0016 307/9.1 |
| 2013/0317697 A1* | 11/2013 | Hotta | ................. | G01R 31/382 702/63 |
| 2014/0079960 A1* | 3/2014 | Yun | ................. | H02J 7/34 429/7 |
| 2014/0354054 A1* | 12/2014 | Katou | ................. | B60L 3/12 307/43 |
| 2015/0372517 A1* | 12/2015 | Lee | ................. | B60L 58/14 320/134 |
| 2016/0013669 A1* | 1/2016 | Shiraishi | ................. | H02J 7/0014 320/118 |
| 2016/0049813 A1* | 2/2016 | Takizawa | ................. | H01M 10/482 320/112 |
| 2016/0241052 A1* | 8/2016 | Yang | ................. | H02J 7/0019 |
| 2016/0301232 A1* | 10/2016 | Shiobara | ................. | H02J 7/0068 |
| 2018/0026456 A1* | 1/2018 | Kang | ................. | H01M 10/441 320/134 |
| 2018/0233787 A1* | 8/2018 | Kubota | ................. | H01M 10/482 |
| 2018/0278065 A1* | 9/2018 | Hoyt | ................. | H02J 7/0024 |
| 2018/0309172 A1* | 10/2018 | Ito | ................. | H02J 7/00 |
| 2019/0277923 A1* | 9/2019 | Inamoto | ................. | H02J 7/0019 |
| 2020/0062140 A1* | 2/2020 | Zhou | ................. | B60L 50/64 |
| 2020/0171971 A1* | 6/2020 | Tiedtke | ................. | B60L 58/24 |
| 2020/0177007 A1* | 6/2020 | Tiedtke | ................. | H02J 7/005 |
| 2020/0177008 A1* | 6/2020 | Tiedtke | ................. | B60L 1/00 |
| 2020/0274371 A1* | 8/2020 | Kirleis | ................. | B60L 53/00 |
| 2021/0226267 A1* | 7/2021 | Books | ................. | B60L 53/62 |
| 2021/0273461 A1* | 9/2021 | Lin | ................. | H02J 7/0016 |
| 2022/0109317 A1* | 4/2022 | Tiedtke | ................. | B60L 1/00 |

FOREIGN PATENT DOCUMENTS

| | | | | |
|---|---|---|---|---|
| EP | 1837944 A2 | 9/2007 | | |
| EP | 2372867 A1 | 10/2011 | | |
| EP | 2980954 A1 | 2/2016 | | |
| EP | 3073604 A1 | 9/2016 | | |
| KR | 10-1483129 B1 | 1/2015 | | |
| KR | 10-1696160 B1 | 1/2017 | | |
| KR | 10-2018-0011584 A | 2/2018 | | |
| WO | WO 2012/043723 A | 4/2012 | | |
| WO | WO-2012043723 A1 * | 4/2012 | ......... | H01M 10/441 |

\* cited by examiner

BATTERY SYSTEM

CROSS-REFERENCE TO RELATED APPLICATION

Korean Patent Application No. 10-2019-0129338, filed on Oct. 17, 2019, in the Korean Intellectual Property Office, and entitled: "Battery System," is incorporated by reference herein in its entirety.

BACKGROUND

1. Field

Embodiments relate to a battery system.

2. Description of Related Art

An energy storage system may be used to improve energy efficiency by storing power when power demand is low and using or releasing stored power when power demand is high. Recently, as the spread of smart grids and renewable energy has expanded and the efficiency and stability of power systems are emphasized, the demand for energy storage systems is gradually increasing to regulate power supply and demand, and to improve power quality. The power storage capacity of energy storage systems is also increasing.

SUMMARY

Embodiments are directed to a battery system, including: a plurality of battery modules including a first battery module and a second battery module, the first battery module and the second battery module connected between a first system terminal and a second system terminal in parallel, and a controller configured to control the plurality of battery modules. The first battery module may include a first battery and a first main switch, which are serially connected between the first system terminal and the second system terminal, and a first balancing switch and a first balancing resistor, which are connected to the first main switch in parallel and connected to each other in series, The second battery module may include a second battery and a secondary main switch, which are serially connected between the first system terminal and the second system terminal, and a second balancing switch and a second balancing resistor, which are connected to the second main switch in parallel and connected to each other in series. The controller may be configured to detect a first battery voltage of the first battery and a second battery voltage of the second battery, and when an absolute value of a difference between the first battery voltage and the second battery voltage is greater than a first reference value, to open the first main switch and the second main switch and to close the first balancing switch and the second balancing switch.

The controller may be configured to, in a case where an absolute value of a difference between the first battery voltage and the second battery voltage is greater than a second reference value and is less than or equal to the first reference value, close the first main switch and the second balancing switch and to open the first balancing switch and the second main switch, or configured to close the second main switch and the first balancing switch and to open the second balancing switch and the first main switch, and the controller may be configured to, in a case where the first battery module is newly replaced and added, when an absolute value of a difference between the first battery voltage and the second battery voltage is greater than the second reference value and is less than or equal to the first reference value, close the second main switch and the first balancing switch and to open the second balancing switch and the first main switch, and the controller may be configured to, in a case where the second battery module is newly replaced and added, when an absolute value of a difference between the first battery voltage and the second battery voltage is greater than the second reference value and is less than or equal to the first reference value, close the first main switch and the second balancing switch and to open the first balancing switch and the second main switch.

The controller may be configured to, in a case where an absolute value of a difference between the first battery voltage and the second battery voltage is less than or equal to the second reference value, close the first main switch and the second main switch and to open the first balancing switch and the second balancing switch.

Each of the plurality of battery modules may include a battery and a main switch, which are serially connected between the first system terminal and the second system terminal, and a balancing switch and a balancing resistor, which are connected to the main switch in parallel and connected to each other in series. The controller may be configured to detect a battery voltage of each of batteries of the plurality of battery modules in a state in which all of the main switches and the balancing switches of the plurality of battery modules are open.

The first battery module may be a battery module including a battery having a highest battery voltage among the plurality of battery modules, and the second battery module may be a battery module including a battery having a lowest battery voltage among the plurality of battery modules.

BRIEF DESCRIPTION OF THE DRAWINGS

Features will become apparent to those of skill in the art by describing in detail example embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

The terms used in this application are only used to describe specific embodiments, and are not intended to limit the present disclosure. As used herein, the singular forms "a," "an," and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. It will be understood that although the terms "first," "second," etc. may be used herein to describe various components, these components should not be limited by these terms. These terms are used only to distinguish one component from other components.

Figure 1:
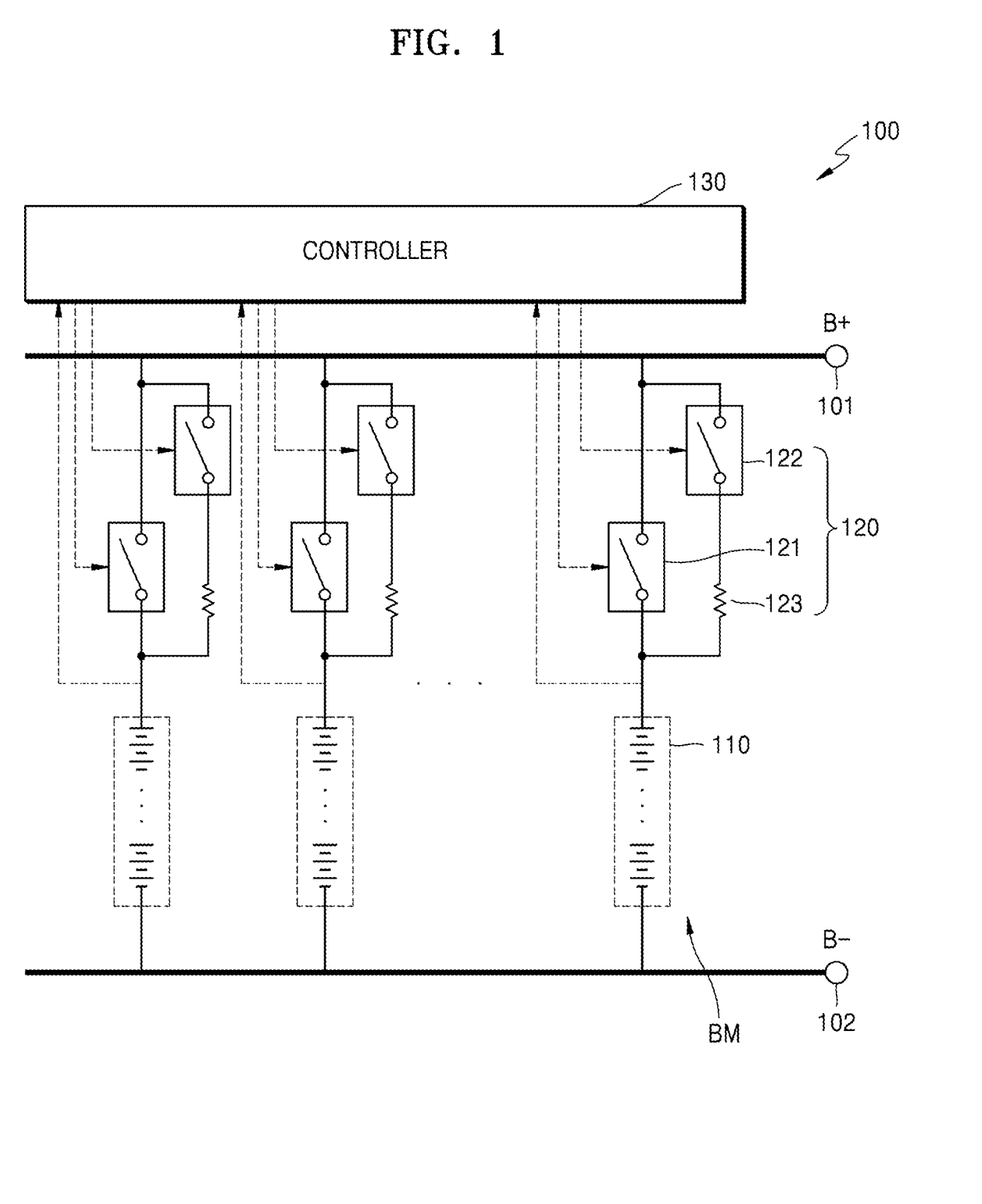
FIG. 1 is a block diagram of a battery system according to an example embodiment.

FIG. 1 is a block diagram of a battery system according to an example embodiment.

Referring to FIG. 1, a battery system 1 may include a first system terminal 101, a second system terminal 102, a plurality of battery modules BM, and a controller 130.

The battery modules BM may be connected in parallel between the first system terminal 101 and the second system terminal 102. The battery modules BM may include a first battery module and a second battery module. Each of the battery modules BM may include a battery 110 and a protection circuit 120.

The first system terminal 101 and the second system terminal 102 may be connected to an electric load that receives power stored in the battery system 100, or, to a power device, for example, a rectifier, a converter, a power generator, or the like, so as to supply power to the battery system 100.

The battery 110, which is a component for storing power, may include one battery cell, more than one battery cell connected in series, or a plurality of battery cells connected in series and in parallel, etc. Each of the plurality of battery cells may include a rechargeable secondary battery. For example, the battery cell may include at least one selected from the group of a nickel-cadmium battery, a lead acid battery, a nickel metal hydride (NiMH) battery, a lithium ion battery, a lithium polymer battery, and the like. The number of battery cells included in the battery 110 may be determined according to a desired output voltage and the storage capacity of the battery module BM.

The protection circuit 120 may be arranged between the battery 110 and, e.g., the first system terminal 101, as shown in FIG. 1, or the protection circuit 120 may be arranged between the battery 110 and the second system terminal 102. The protection circuit 120 may include a main switch 121, a balancing switch 122, and a balancing resistor 123. The main switch 121 and the balancing switch 122 of the protection circuit 120 may be controlled by the controller 130.

The main switch 121 may be connected to the battery 110 in series. The battery 110 and the main switch 121 may be serially connected between the first system terminal 101 and the second system terminal 102. The main switch 121 may connect or disconnect a current path between the battery 110 and the first system terminal 101.

The balancing switch 122 and the balancing resistor 123 may be connected to the main switch 121 in parallel. The balancing switch 122, the balancing resistor 123, and the battery 110 may be serially connected between the first system terminal 101 and the second system terminal 102. The balancing switch 122 may connect or disconnect a current path passing through the balancing resistor 123 between the battery 110 and the first system terminal 101.

The main switch 121 and the balancing switch 122 may be composed of a relay switch or a power transistor and may be referred to as open (i.e., not conducting) or closed (i.e., conducting). The main switch 121 and the balancing switch 122 may be operated under the control of the controller 130.

In a case where battery voltages of the batteries 110 are different from each other, and when the batteries 110 are connected in parallel, an overcurrent may flow between the batteries 110 due to a difference in the battery voltages of the batteries 110. This overcurrent may damage the batteries 110 or the protection circuit 120. The balancing resistor 123 may be used to equalize the battery voltages of the batteries 110 so as to reduce or prevent this overcurrent.

Before closing the main switch 121 so as to connect the battery 110 to the first system terminal 101, the balancing switch 122 may be closed while the main switch 121 is open. When the balancing switch 122 is closed, a current having a limited magnitude may be supplied to the battery 110 through the balancing resistor 123 or may be discharged from the battery 110.

For example, in a case where a system terminal voltage between the first and second system terminals 101 and 102 is higher than the battery voltage of the battery 110, when the balancing switch 122 is closed, a current may flow into the battery 110. The system terminal voltage may be battery voltages of other electrically-connected batteries 110 through the main switch 121 in a closed state between the first and second system terminals 101 and 102. In another case where the system terminal voltage is lower than the battery voltage of the battery 110, when the balancing switch 122 is closed, a current may flow out from the battery 110. In this case, the balancing resistor 123 may limit the magnitude of the current so that no overcurrent causing the damage of the battery 110 may be generated.

In a case where the balancing resistors 123 of the battery modules BM have a uniform size, when a voltage difference between the system terminal voltage and the battery voltage is not large, the magnitude of the current that flows into the battery 110 or flows out from the battery 110 may also be small, and thus it may take time to equalize the battery voltage of the battery 110 with the system terminal voltage. The battery system 100 may wait to start operating for a state in which all of battery voltages of the batteries 110 are equalized, in which case it may take a considerable amount of time to start operating.

The controller 130 may control the main switch 121 and the balancing switch 122 of the battery modules BM. The controller 130 may be a part of a battery management unit or may include a plurality of battery management units. According to an example embodiment, the battery management unit may control charging and discharging of the battery modules BM. According to another example embodiment, a number of battery management units corresponding to the number of the battery modules BM may be present, and may control charging and discharging of the corresponding battery module BM. The battery management units may communicate with each other. The controller 130 may also control the battery management units. The controller 130 may receive the state of the corresponding battery module BM from the battery management units and may control charging and discharging of the corresponding battery module BM and the main switch 121 and the balancing switch 122 through the battery management unit.

Figure 2:
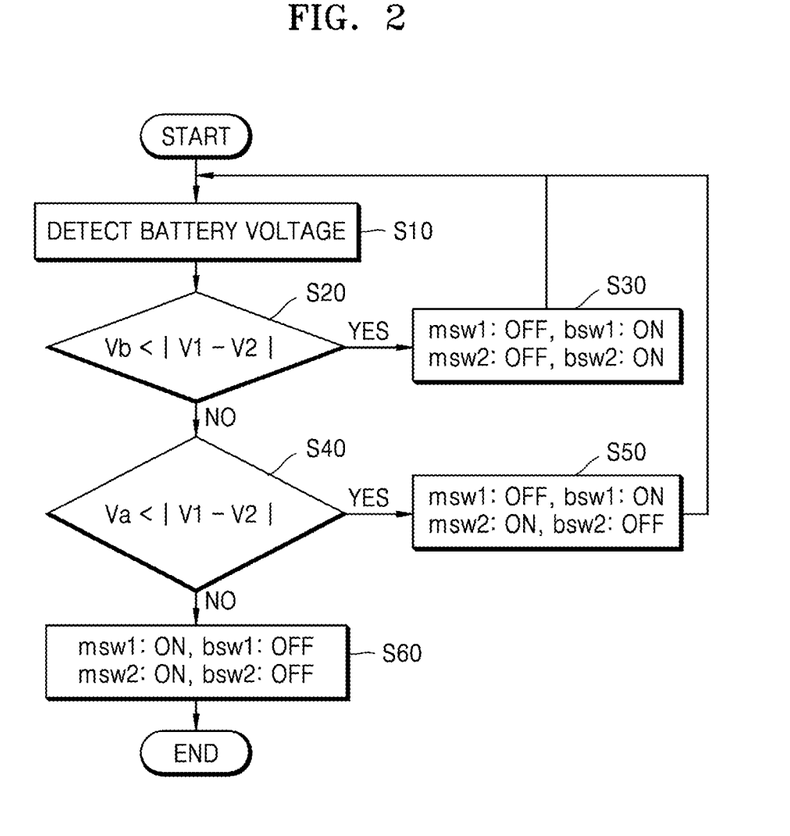
FIG. 2 is a flowchart illustrating a method of adjusting battery voltages equally according to an example embodiment.
Figure 3A:
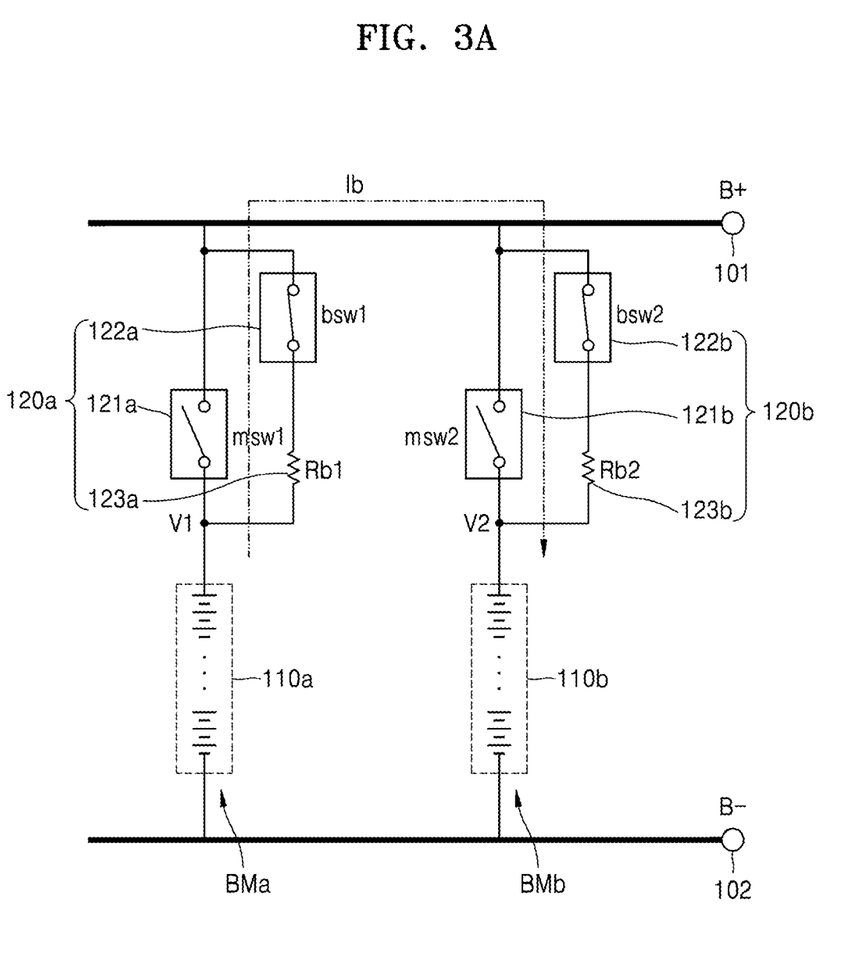
FIGS. 3A through 3C schematically illustrate a battery system that operates according to the method of FIG. 2.
Figure 3B:
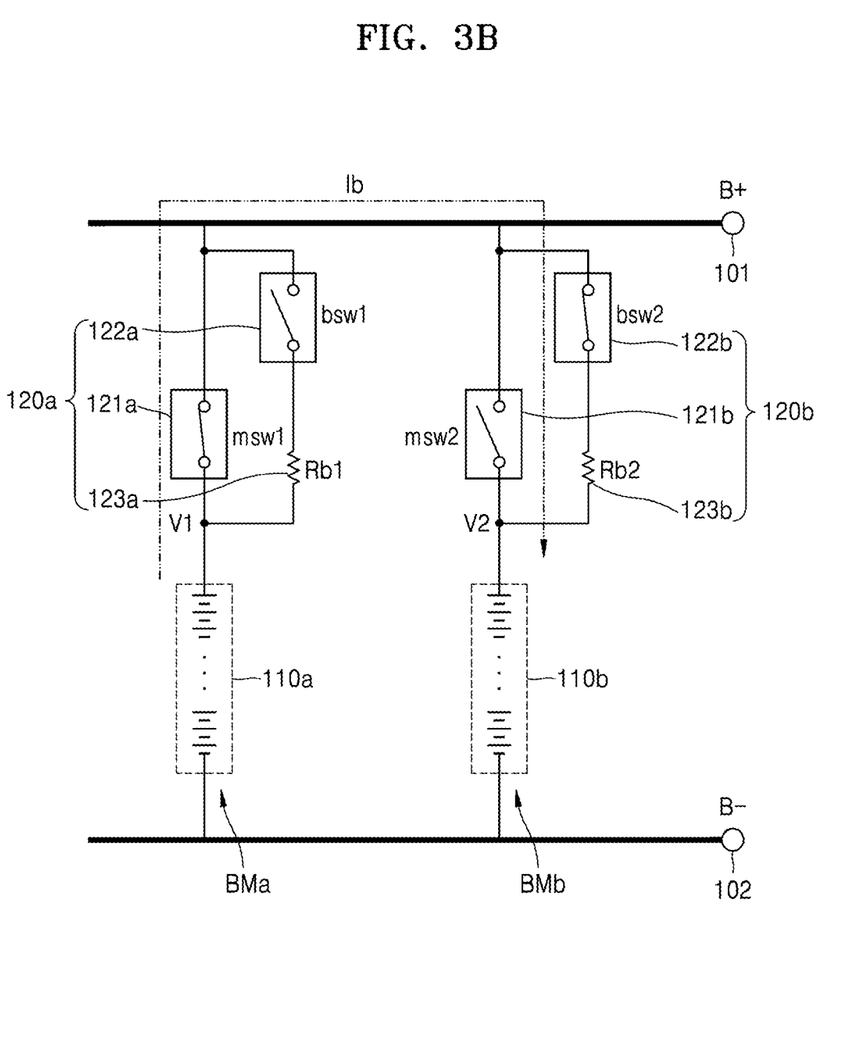
Figure 3C:
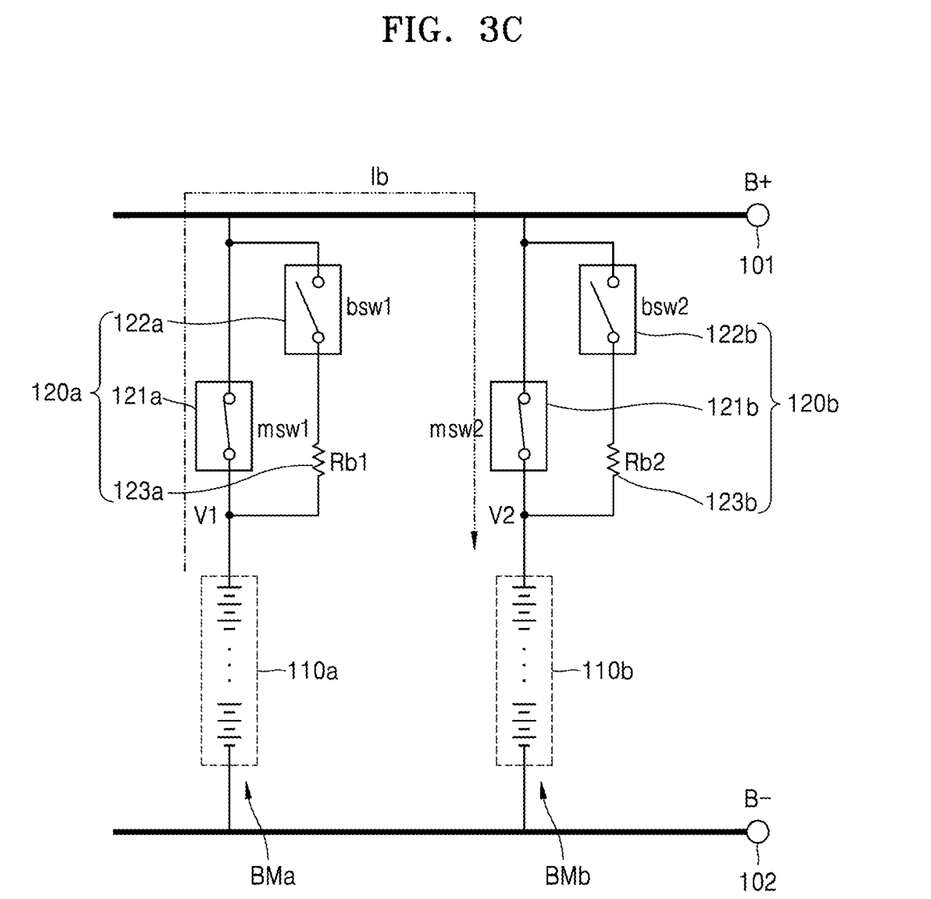

FIG. 2 is a flowchart illustrating a method of adjusting battery voltages equally according to an example embodiment. FIGS. 3A through 3C schematically illustrate a battery system that operates according to the method of FIG. 2.

Referring to FIG. 2 and FIGS. 3A through 3C, the controller (see 130 of FIG. 1) may detect a battery voltage of each of the battery modules BM in Operation S10. The battery modules BM may include a first battery module BMa and a second battery module BMb. The controller 130 may detect a first battery voltage V1 of the first battery module BMa and detect a second battery voltage V2 of the second battery module BMb.

The first battery module BMa (including a first battery 110a and a first protection circuit 120a) and the second battery module BMb (including a second battery 110b and a second protection circuit 120b) are illustrated in FIG. 3.

The first battery module BMa may include a first battery 110a and a first main switch 121a, which are serially connected between the first system terminal 101 and the second system terminal 102, and a first balancing switch 122a and a first balancing resistor 123a, which are connected to the first main switch 121a in parallel and connected to each other in series. It is assumed that the first battery 110a has a first battery voltage V1.

The second battery module BMb may include a second battery 110b and a second main switch 121b, which are serially connected between the first system terminal 101 and the second system terminal 102, and a second balancing switch 122b and a second balancing resistor 123b, which are connected to the second main switch 121b in parallel and connected to each other in series. It is assumed that the second battery 110b has a second battery voltage V2.

According to an example embodiment, the battery modules BM may include other battery modules than the first and second battery modules BMa and BMb. The controller 130 may detect all of battery voltages of the battery modules BM. The first battery module BMa may be a battery module having a highest battery voltage among the battery modules BM, and the second battery module BMb may be a battery module having a lowest battery voltage among the battery modules BM.

In an example embodiment, the first battery module BMa and the second battery module BMb may be exchanged with other battery modules as the equalization of the battery voltages is performed according to the method of FIG. 2. For example, according to an embodiment, when one among the battery modules BM is deteriorated, the deteriorated battery module BM may be replaced. For example, the first battery module BMa may be a battery module that is not replaced among the battery modules BM, and the second battery module BMb may be a battery module that is newly provided by replacement. The second battery voltage V2 of the second battery module BMb may be higher or lower than the first battery voltage V1 of the first battery module BMa.

The controller 130 may compare a voltage difference |V1−V2| between the first battery voltage V1 of the first battery module BMa and the second battery voltage V2 of the second battery module BMb with a first reference value Vb in Operation S20. The voltage difference |V1−V2| between the first battery voltage V1 and the second battery voltage V2 may be an absolute value of a value obtained by subtracting the second battery voltage V2 from the first battery voltage V1. Hereinafter, for easy understanding, it is assumed that the first battery voltage V1 is higher than the second battery voltage V2.

When the voltage difference |V1−V2| between the first battery voltage V1 and the second battery voltage V2 is greater than the first reference value Vb, the controller 130 may open (i.e., turn off) the first main switch 121a and the second main switch 121b and may close (i.e., turn on) the first balancing switch 122a and the second balancing switch 122b, as shown in FIG. 3A, in Operation S30.

When the first balancing switch 122a and the second balancing switch 122b are closed, a conductive path passing through a first balancing resistor Rb1 and a second balancing resistor Rb2 is formed between the first battery 110a and the second battery 110b, and a balancing current Ib may flow from the first battery 110a into the second battery 110b along the conductive path. The balancing current Ib may have a magnitude corresponding to a value obtained by dividing the voltage difference |V1−V2| between the first battery voltage V1 and the second battery voltage V2 by the sum (Rb1+Rb2) of the first balancing resistor Rb1 and the second balancing resistor Rb2. Here, for the sake of clarity, internal resistances of the first battery 110a and the second battery 110b are neglected.

The first balancing resistor Rb1 and the second balancing resistor Rb2 may have the same resistance values Rb. In this case, the balancing current Ib may have the magnitude of |V1−V2|/2Rb. The resistance value Rb may be set to a smallest value in the range in which the balancing current Ib does not damage the first battery 110a and the second battery 110b even when the voltage difference |V1−V2| is the largest that may exist. For example, when it is assumed that the largest value in which the voltage difference |V1−V2| may exist is a maximum voltage Vmax and the first battery 110a and the second battery 110b are not damaged when the balancing current Ib is less than a threshold current Ith, the resistance value Rb may be set to a value of Vmax/2Ith.

As the balancing current Ib flows from the first battery 110a into the second battery 110b, the first battery voltage V1 may be lowered, and the second battery voltage V2 may be increased. Thus, the voltage difference |V1−V2| between the first battery voltage V1 and the second battery voltage V2 may decrease gradually. However, as the voltage difference |V1−V2| between the first battery voltage V1 and the second battery voltage V2 decreases gradually, the magnitude of the balancing current Ib may also gradually reduced, and the speed at which the voltage difference |V1−V2| between the first battery voltage V1 and the second battery voltage V2 decreases, may also be reduced.

When the voltage difference |V1−V2| between the first battery voltage V1 and the second battery voltage V2 is not greater than the first reference value Vb, the controller 130 may compare the voltage difference |V1−V2| between the first battery voltage V1 and the second battery voltage V2 with a second reference value Va that is lower than the first reference value Vb in Operation S40.

In an example embodiment, the voltage difference |V1−V2| between the first battery voltage V1 and the second battery voltage V2 is greater than the second reference value Va but is not greater than the first reference value Vb, e.g., when the second battery module is newly provided by replacement, the controller 130 may open the first balancing switch 122a and the second main switch 121b and may close the first main switch 121a and the second balancing switch 122b, as shown in FIG. 3B. According to another example embodiment, e.g., when the first battery module is newly provided by replacement, the first balancing switch 122a and the second main switch 121b may be closed, and the first main switch 121a and the second balancing switch 122b may also be open, as illustrated in Operation S50 of FIG. 2.

As shown in FIG. 3B, when the first main switch 121a and the second balancing switch 122b are closed, a path passing through the second balancing resistor Rb2 may be formed between the first battery 110a and the second battery 110b, and the balancing current Ib may flow from the first battery 110a into the second battery 110b along the path. The balancing current Ib may have a magnitude corresponding to a value obtained by dividing the voltage difference |V1−V2| between the first battery voltage V1 and the second battery voltage V2 by the second balancing resistor Rb2. The second balancing resistor Rb2 may have a resistance value Rb.

In FIG. 3A, the balancing current Ib has the magnitude of |V1−V2|/2Rb, but in FIG. 3B, since the balancing current Ib has the magnitude of |V1−V2|/Rb, the balancing current Ib when the voltage difference |V1−V2| is slightly less than the first reference value Vb, may be approximately twice the balancing current Ib when the voltage difference |V1−V2| is slightly greater than the first reference value Vb.

The speed at which the first battery voltage V1 is lowered and the second battery voltage V2 is increased, may be approximately doubled. Thus, the speed at which the voltage difference |V1−V2| between the first battery voltage V1 and the second battery voltage V2 decreases, may be approximately doubled.

When the voltage difference |V1−V2| between the first battery voltage V1 and the second battery voltage V2 is not greater than the second reference value Va, the controller 130 may open the first balancing switch 122a and the second balancing switch 122b and may close the first main switch 121a and the second main switch 121b, as shown in FIG. 3C, in Operation S60.

When the first main switch 121a and the second main switch 121b are closed, the first battery 110a and the second battery 110b may be directly connected, and the balancing current Ib may flow from the first battery 110a into the second battery 110b. The balancing current Ib may have a magnitude corresponding to a value obtained by dividing the voltage difference |V1−V2| between the first battery voltage V1 and the second battery voltage V2 by the sum of internal resistances of the first battery 110a and the second battery 110b. Even when the sizes of the internal resistances of the first battery 110a and the second battery 110b are small, the voltage difference |V1−V2| between the first battery voltage V1 and the second battery voltage V2 may be less than or equal to the second reference value Va. Thus, the balancing current Ib having a large magnitude may not flow. The second reference value Va may be set in such a way that the first battery 110a and the second battery 110b may not be damaged even when the first battery 110a and the second battery 110b are directly connected and the balancing current Ib flows between the first battery 110a and the second battery 110b.

Figure 4:
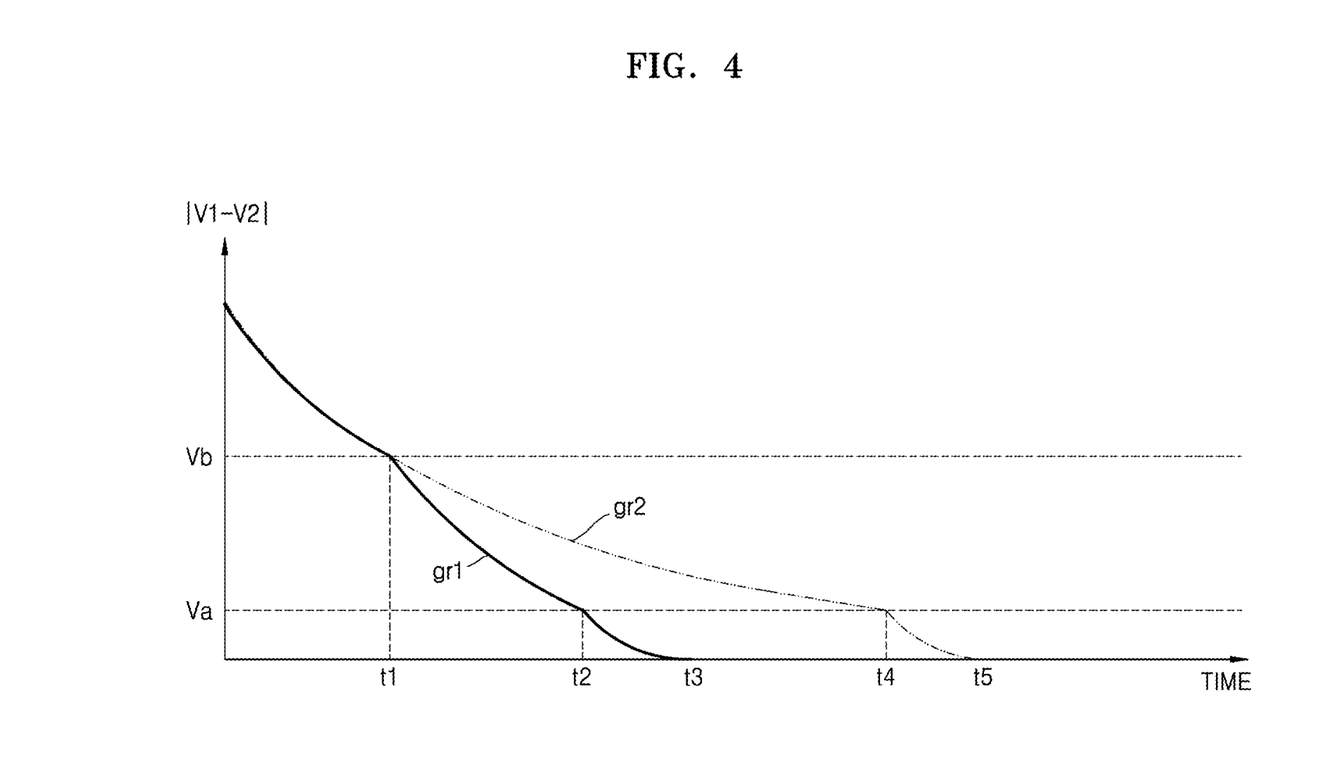
FIG. 4 is a graph for comparing time required for adjusting battery voltages equally according to an example embodiment and a comparative example, respectively.

FIG. 4 is a graph for comparing time required for adjusting battery voltages equally according to an example embodiment and a comparative example, respectively.

Referring to FIG. 4, the first graph gr1 shows how the voltage difference |V1−V2| decreases according to an example embodiment, and the second graph gr2 shows how the voltage difference |V1−V2| decreases according to a comparative example.

According to the comparative example, the controller 130 may compare the voltage difference |V1−V2| between the first battery voltage V1 and the second battery voltage V2 with the second reference value Va, and when the voltage difference |V1−V2| is greater than the second reference value Va, may open the first balancing switch 122a and the second main switch 121b and may close the first main switch 121a and the second balancing switch 122b, as shown in FIG. 3B, and when the voltage difference |V1−V2| is not greater than the second reference value Va, may open the first balancing switch 122a and the second balancing switch 122b and may close the first main switch 121a and the second main switch 121b, as shown in FIG. 3C.

According to the comparative example, when it is assumed that the largest value in which the voltage difference |V1−V2| may exist, is a maximum voltage Vmax and the balancing current Ib is less than the threshold value Ith, the first battery 110a and the second battery 110b are not damaged, the second resistor Rb2 is set to have a resistance value Vmax/Ith.

On the other hand, as described above, according to an example embodiment, the first and second balancing resistors Rb1 and Rb2 have the resistance value of Vmax/2Ith. Thus, the first and second balancing resistors Rb1 and Rb2 according to the comparative example are set to have a resistance value 2Rb that is twice as large as the first and second balancing resistors Rb1 and Rb2 according to the example embodiment.

According to the comparative example, when the voltage difference |V1−V2↑ is greater than the second reference value Va, the balancing current Ib has a magnitude of |V1−V2|/2Rb. Thus, when the voltage difference |V1−V2| is greater than the first reference value Va, in both the example embodiment and the comparative example, the voltage difference |V1−V2| decreases at the same speed, as shown in FIG. 4.

When a first time t1 elapses and the voltage difference |V1−V2| becomes equal to the first reference value Vb, according to the example embodiment, as described above, the balancing current Ib has a magnitude of|V1−V2|/Rb. On the other hand, according to the comparative example, the balancing current Ib has a magnitude of|V1−V2|/2Rb. Thus, as shown in FIG. 4, the speed at which the voltage difference |V1−V2| decreases according to the comparative example, is slower by approximately ½ the speed at which the voltage difference |V1−V2| decreases according to the example embodiment.

As a result, according to the example embodiment, the voltage difference |V1−V2| reaches the second reference value Va at a second time t2, but, according to the comparative example, the voltage difference |V1−V2| reaches the second reference value Va at a fourth time t4 that is slower, i.e., delayed, relative to the second time t2.

According to the example embodiment, the first battery 110a and the second battery 110b may be directly connected at the second time t2, as shown in FIG. 3C, and when reaching a third time t3, the first battery voltage V1 and the second battery voltage V2 may be equal to each other. On the other hand, according to the comparative example, the first battery 110a and the second battery 110b may be directly connected at the fourth time t4, and when reaching a fifth time t5, the first battery voltage V1 and the second battery voltage V2 may be equal to each other. Thus, according to the example embodiment, time required for the first battery 110a and the second battery 110b to have the same size as each other, may be significantly reduced compared to the case of the comparative example. When the battery system 100 starts newly or one of the battery modules BM is replaced, time required to start a normal operation may be reduced, and thus the normal operation may start faster than the existing system.

By way of summation and review, by connecting battery modules including battery cells in parallel, a battery system may have a large power storage capacity. If a voltage of each of the battery modules is different, an inrush current may be generated at the moment that the battery modules are connected in parallel, and this inrush current may damage the battery cells and protection circuits.

In a battery system according to one or more embodiments, it may be possible to reduce a time required to operate the battery system stably after a deteriorated battery module has been replaced in the battery system.

One or more embodiments include a battery system that may operate quickly and stably after a dead battery module has been replaced.

In the above description, for the sake of brevity, conventional electronics, control systems, software development and other functional aspects of the systems (and components of the individual operating components of the systems) may not be described in detail. Furthermore, the connection lines, or connectors shown in the various figures presented are intended to represent example functional relationships and/or physical or logical couplings between the various elements. It should be noted that many alternative or additional functional relationships, physical connections or logical connections may be present in a practical device. Moreover, no item or component is essential to the practice of the present disclosure unless the element is specifically described as "essential" or "critical".

Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The present disclosure is not necessarily limited according to the description order of the steps. The use of any and all examples, or example language (e.g., "such as") provided herein, is intended merely to better illuminate the embodiments and does not pose a limitation on the scope of the embodiments unless otherwise claimed.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery system, comprising:
   a plurality of battery modules including a first battery module and a second battery module, the first battery module and the second battery module being connected between a first system terminal and a second system terminal in parallel; and
   a controller configured to control the plurality of battery modules, wherein:
   the first battery module includes a first battery and a first main switch, which are serially connected between the first system terminal and the second system terminal, and a first balancing switch and a first balancing resistor, which are connected to the first main switch in parallel and are connected to each other in series,
   the second battery module includes a second battery and a secondary main switch, which are serially connected between the first system terminal and the second system terminal, and a second balancing switch and a second balancing resistor, which are connected to the second main switch in parallel and are connected to each other in series,
   the controller is configured to detect a first battery voltage of the first battery and a second battery voltage of the second battery, and when an absolute value of a difference between the first battery voltage and the second battery voltage is greater than a first reference value, to open the first main switch and the second main switch and to close the first balancing switch and the second balancing switch, and
   the controller is configured to, in a case where an absolute value of a difference between the first battery voltage and the second battery voltage is greater than a second reference value and is less than or equal to the first reference value, close the first main switch and the second balancing switch and to open the first balancing switch and the second main switch, or configured to close the second main switch and the first balancing switch and to open the second balancing switch and the first main switch.

2. The battery system of claim 1, wherein the controller is configured to, in a case where the first battery module is newly provided by replacement, when an absolute value of a difference between the first battery voltage and the second battery voltage is greater than the second reference value and is less than or equal to the first reference value, close the second main switch and the first balancing switch and to open the second balancing switch and the first main switch, and
   the controller is configured to, in a case where the second battery module is newly provided by replacement, when an absolute value of a difference between the first battery voltage and the second battery voltage is greater than the second reference value and is less than or equal to the first reference value, close the first main switch and the second balancing switch and to open the first balancing switch and the second main switch.

3. The battery system of claim 1, wherein the controller is configured to, in a case where an absolute value of a difference between the first battery voltage and the second battery voltage is less than or equal to the second reference value, close the first main switch and the second main switch and to open the first balancing switch and the second balancing switch.

4. The battery system of claim 1, wherein each of the plurality of battery modules includes a battery and a main switch, which are serially connected between the first system terminal and the second system terminal, and a balancing switch and a balancing resistor, which are connected to the main switch in parallel and connected to each other in series, and
   the controller is configured to detect a battery voltage of each of batteries of the plurality of battery modules in a state in which all of the main switches and the balancing switches of the plurality of battery modules are open.

5. The battery system of claim 4, wherein the first battery module is a battery module including a battery having a highest battery voltage among the plurality of battery modules, and the second battery module is a battery module including a battery having a lowest battery voltage among the plurality of battery modules.

\* \* \* \* \*